June 8, 1948. P. H. MERONEY 2,442,956
TIRE DEFLATION INDICATING DEVICE
Filed Nov. 28, 1944 2 Sheets-Sheet 1
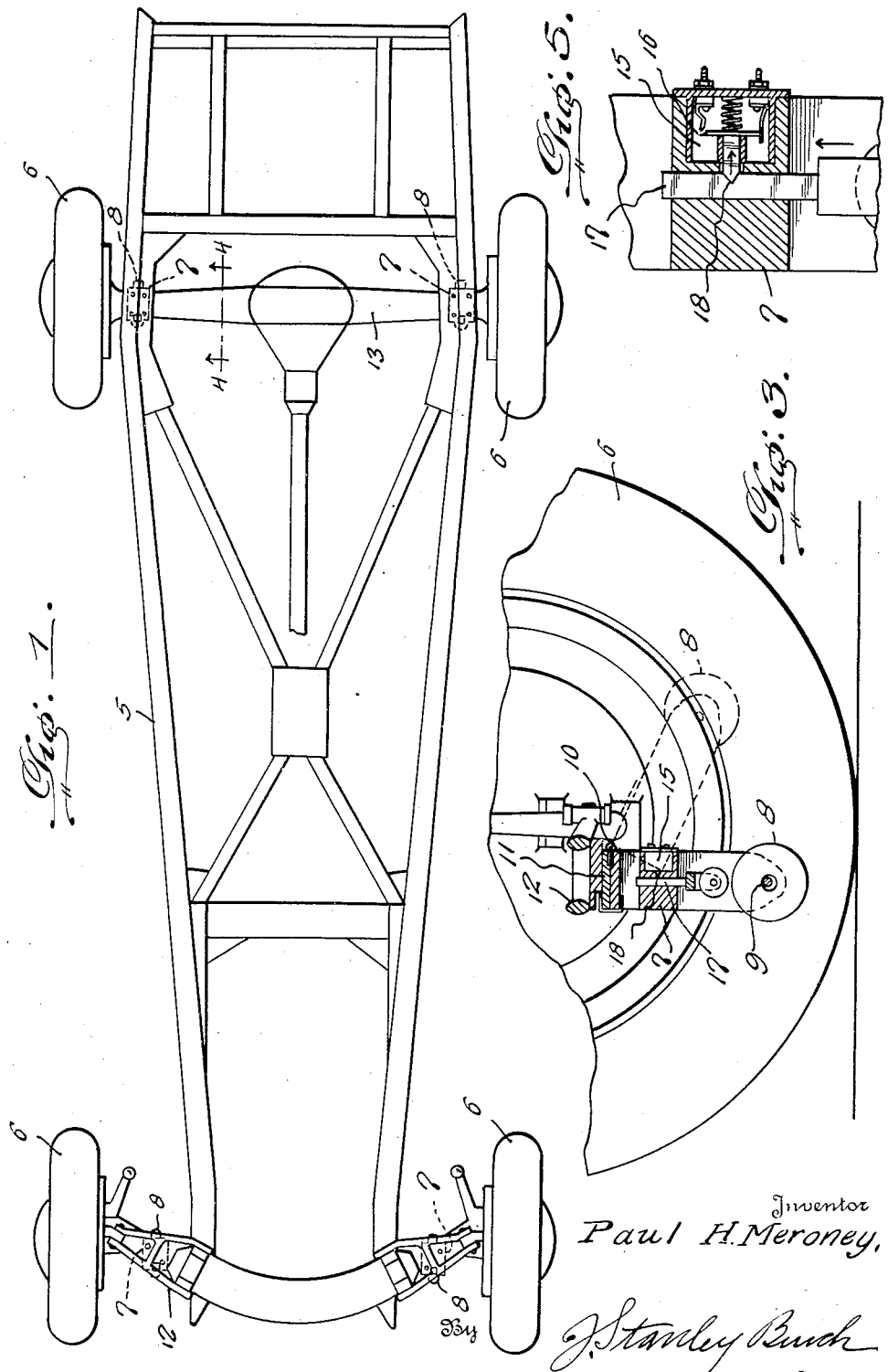
Inventor
Paul H. Meroney,
By J. Stanley Burch
Attorney June 8, 1948. P. H. MERONEY 2,442,956
TIRE DEFLATION INDICATING DEVICE
Filed Nov. 28, 1944 2 Sheets-Sheet 2
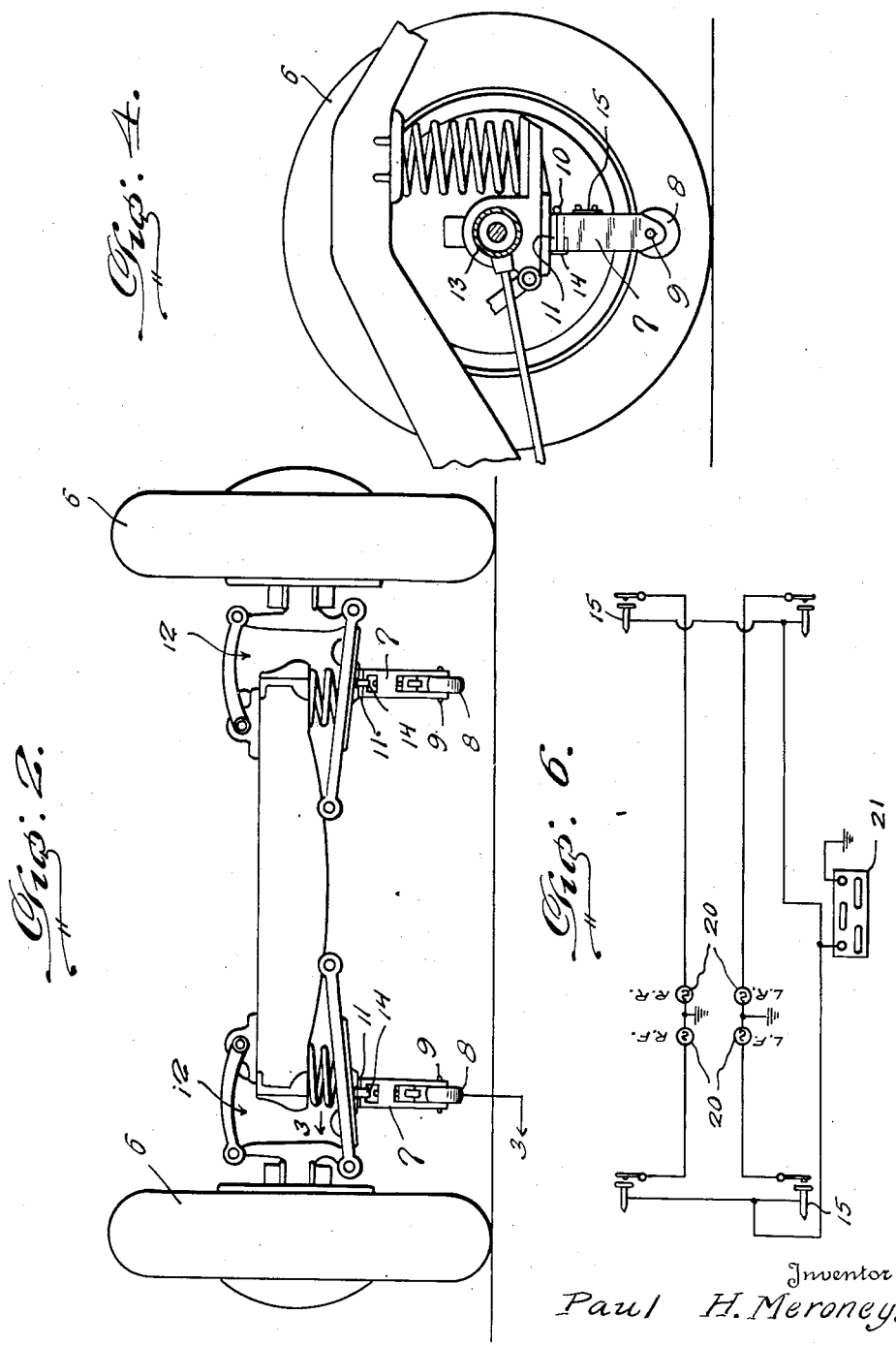
Inventor
Paul H. Meroney,
By Stanley Busch
Attorney Patented June 8, 1948

2,442,956

UNITED STATES PATENT OFFICE 2,442,956

TIRE DEFLATION INDICATING DEVICE

Paul H. Meroney, Canby, Calif.

Application November 28, 1944, Serial No. 565,539

1 Claim. (Cl. 200—58)

This invention relates to means for indicating to the driver of a motor vehicle that a pneumatic tire of the vehicle is abnormally deflated, whenever the latter occurs.

The primary object of the present invention is to provide a tire deflation indicating means of the above kind which is comparatively simple in construction, easy to install, and efficient in operation.

More particularly, the present invention contemplates the provision of an indicating signal and means for rendering said signal operative including a road engaging element adapted to contact the road or ground when the associated vehicle tire becomes abnormally deflated, means being provided for mounting said road engaging element in a suitable position upon the vehicle axle in such a way that it may yield rearwardly in case it should strike an obstruction, whereby serious damage to or destruction of the road contacting element or its mounting will be avoided.

The present invention contemplates the provision of a separate signal and controlling means therefor associated with each of the wheels of a vehicle so that the particular tire or tires which may be abnormally deflated can be readily determined.

With the above general objects in view, the present invention consists in the novel form, combination and arrangement of parts hereinafter more fully described, shown in the accompanying drawings and claimed.

In the drawings:

Figure 1 is a top plan view of a motor vehicle chassis equipped with signal controlling means constructed in accordance with the present invention, one such controlling means being associated with or adjacent each wheel of the vehicle.

Figure 2 is a front elevational view looking towards the right of Figure 1.

Figure 3 is a vertical section taken on line 3—3 of Figure 2.

Figure 4 is a fragmentary section taken on line 4—4 of Figure 1.

Figure 5 is a fragmentary sectional view showing a portion of the signal controlling means as illustrated in Figure 3, but drawn on a larger scale for sake of clearness; and Figure 6 is a wiring diagram showing the manner in which the various signals and controlling therefor may be connected in circuits associated with a common source of electricity.

Referring in detail to the drawings, 5 indicates the frame of a motor vehicle chassis equipped with the usual front and rear supporting wheels having pneumatic tires 6. In accordance with the present invention, a signal controlling means is associated with each vehicle wheel and mounted upon the vehicle inwardly of the associated vehicle wheel as shown in Figure 3 with respect to the front vehicle wheels, and as shown in Figure 4 with respect to the rear vehicle wheels. Each such signal controlling means consists of a vertical mount 7 having a forked lower end in which is journalled a ground or road engaging element 8 preferably in the form of a roller loosely mounted upon a pin or axle 9 for limited vertical movement relative to the mount 7. The mount 7 is hinged at the top as at 10 to an attaching plate 11 suitably bolted to the associated axle member or axle housing. As shown in Figures 2 and 3, the axle member will consist of the lower vertically movable arm 12 of the usual knee action construction, while such member will consist of the rear axle housing 13 with respect to the signal controlling means associated with the rear vehicle wheel. The hinge 10 is so provided as to permit rearward swinging of the mount 7 relative to the attaching plate 11 and the associated axle member or housing in the event that the roller or contact element 8 meets with a serious road obstruction. Thus, by permitting the mount to swing rearwardly as indicated by dotted lines in Figure 3, serious damage to or destruction of the signal controlling means will be prevented under abnormal conditions. To releasably retain the mount in its forwardly swung or normal operative position as shown by full lines in Figure 3, a suitable clip 14 may be engaged with the attaching plate 11 and the mount 7. When the mount 7 is forced rearwardly by sufficient power, the clip 14 will be spread so that the rearward swinging of the mount 7 relative to attaching plate 11 will be permitted.

Carried by the mount 7 directly above the road contacting element or roller 8 is a switch 15 which controls the signal circuits for the associated signal controlling means, and this switch includes a movable contact 16 and a vertically movable operating element 17 therefor arranged directly above the road contacting element or roller 8. The arrangement is such that when the tire 6 becomes abnormally deflated the element or roller 8 will engage the ground and be moved upwardly so as to force the operating member 17 upwardly and thereby actuate the movable contact 16 of switch 15 so that the latter will close the associated signal circuit. While this switch may be of any preferred or well known construction, it is shown as having the movable contact 16 carried by a horizontal plunger normally engaging in a recess 18 provided in one side of the vertically movable actuating member 17 and normally pressed into engagement therewith by a spring 19. The arrangement is such that when the member 17 is normally positioned the plunger will engage in the recess at 18 and hold the member 17 in normal operative position. However, when the member 17 is forced upwardly by the roller or contact element 8, the plunger or contact 16 will yield and permit the same to rise, after which the frictional engagement of said plunger with member 17 will hold the latter elevated so that the signal will remain operative until the member 17 is again manually lowered as permitted by restoration of the tire 6 to its proper inflated position or by jacking the associated wheel upwardly relative to the ground so that the contact or roller 8 is disengaged from the ground. The signal controlled by each switch 15 may be of any preferred kind such as a signal light 20 shown in Figure 6. As shown in this figure, the switch 15 associated with each vehicle wheel may be wired to a separate signal 20, and all of the signals may receive current from a single battery or source of electricity 21. The signal controlling means associated with the rear wheels of the vehicle as shown in Figures 1 and 4 will be identical with those associated with the front wheels of the vehicle except for slight change in the specific means for attaching the plate 11 to the vehicle.

Thus, with separate signals controlled by the switches for the various vehicle wheels, the operator of the vehicle may readily determine which vehicle tire is abnormally deflated by noting which signal is rendered operative.

From the foregoing description, it is believed that the construction and operation, as well as the advantages of the present invention, will be readily understood and appreciated by those skilled in the art.

What I claim as new is:

A tire deflation indicating device for a motor vehicle comprising an attaching member adapted to be rigidly secured to an axle member of the vehicle, a rigid roller mount hinged at the rear of its upper end to the rear of said attaching member for forward and downward and rearward and upward swinging movement relative thereto, the upper end of said roller mount being movable into contact with said attaching member so as to be limited by the latter in its forward and downward swinging movement to a substantially vertical position, a roller journaled on the lower end of said roller mount for limited vertical movement relative to the latter and arranged to contact the ground so that the device will assume the vehicle supporting function of said wheel when a tire of the vehicle becomes partially deflated, a fastening element engaging the attaching member and said roller mount to retain the latter in its substantially vertical forwardly and downwardly swung position under normal road conditions but releasable by contact of the roller with an obnormal road obstruction to permit rearward and upward swinging movement of said mount, and switch means operable by said roller to close a signal circuit upon upward movement of said roller relative to said mount due to contact of said roller with the ground and assumption of the supporting function of said wheel by said device.

PAUL H. MERONEY.

REFERENCES CITED

The following references are of record in the file of this patent:

UNITED STATES PATENTS

| Number | Name | Date |
|---|---|---|
| 1,638,983 | Crone | Aug. 16, 1927 |
| 1,917,962 | Forrest | July 11, 1933 |
| 1,926,419 | Apple | Sept. 12, 1933 |
| 2,060,377 | Knodle | Nov. 10, 1936 |
| 2,091,101 | Moss | Aug. 24, 1937 |

FOREIGN PATENTS

| Number | Country | Date |
|---|---|---|
| 21,267 | Great Britain | Oct. 4, 1904 |
| 791,580 | France | Sept. 30, 1935 |